(12) United States Patent
Webster

(10) Patent No.: US 8,316,678 B2
(45) Date of Patent: Nov. 27, 2012

(54) METHOD AND AN APPARATUS FOR PRESTRESSING COMPONENTS

(75) Inventor: John Richard Webster, Derby (GB)

(73) Assignee: Rolls-Royce PLC, London (GB)

( * ) Notice: Subject to any disclaimer, the term of this patent is extended or adjusted under 35 U.S.C. 154(b) by 945 days.

(21) Appl. No.: 12/310,541

(22) PCT Filed: Aug. 30, 2007

(86) PCT No.: PCT/GB2007/003268
§ 371 (c)(1),
(2), (4) Date: Feb. 27, 2009

(87) PCT Pub. No.: WO2008/037948
PCT Pub. Date: Apr. 3, 2008

(65) Prior Publication Data
US 2010/0132194 A1 Jun. 3, 2010

(30) Foreign Application Priority Data

Sep. 27, 2006 (GB) .................................. 0618974.0
Sep. 27, 2006 (GB) .................................. 0618976.5

(51) Int. Cl.
*B21D 26/12* (2006.01)
(52) U.S. Cl. ............................ 72/56; 72/430; 29/421.1

(58) Field of Classification Search ................. 72/54, 56, 72/430; 29/421.1
See application file for complete search history.

(56) References Cited

U.S. PATENT DOCUMENTS

| 3,566,648 A | 3/1971 | Norin et al. |
| 3,603,127 A * | 9/1971 | Seiffert et al. ................. 72/56 |
| 3,640,110 A | 2/1972 | Inoue |

FOREIGN PATENT DOCUMENTS

| DE | 44 28 791 C1 | 2/1996 |
| EP | 0 035 091 A1 | 9/1981 |
| EP | 0 964 067 A1 | 12/1999 |
| EP | 1 191 112 A1 | 3/2002 |
| GB | 990404 A | 4/1965 |
| GB | 1 266 059 | 3/1972 |
| JP | A-2006-142338 | 6/2006 |
| SU | 1784359 A1 | 12/1992 |

* cited by examiner

*Primary Examiner* — David B Jones
(74) *Attorney, Agent, or Firm* — Oliff & Berridge, PLC

(57) ABSTRACT

A method of pre-stressing a component comprises providing an electrically conducting sheet adjacent to a component within a medium. An electrical discharge is supplied from an electrical discharge circuit to the electrically conducting sheet to produce vaporization of the electrically conducting sheet. The vaporization of the electrically conducting sheet produces a planar pressure pulse in the medium adjacent to the component. The planar pressure pulse impacts on a surface of the component to produce a region of residual compressive stress within the component.

33 Claims, 8 Drawing Sheets

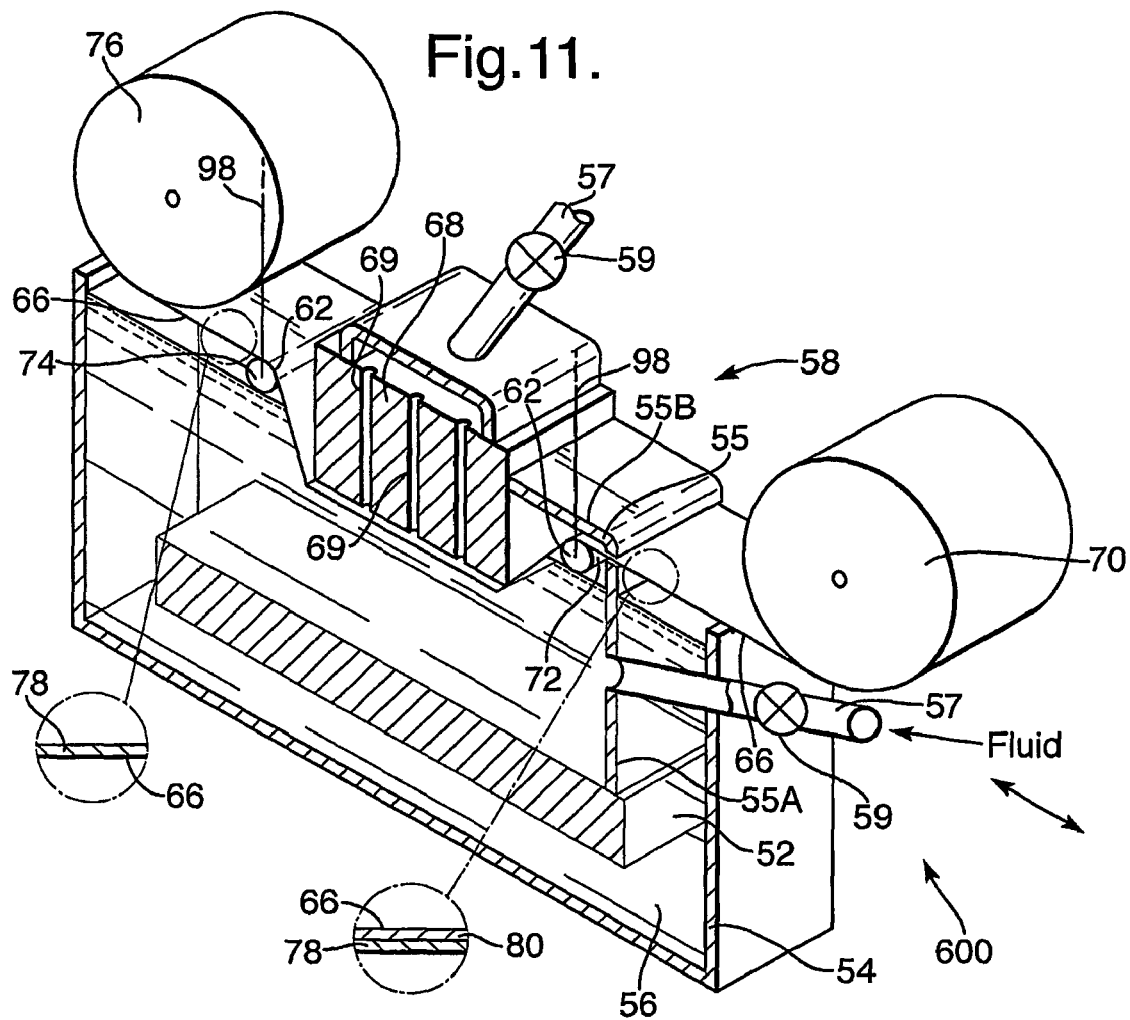

METHOD AND AN APPARATUS FOR PRESTRESSING COMPONENTS

The present invention relates to a method and an apparatus for pre-stressing components and in particular to a method and an apparatus for pre-stressing of gas turbine engine components for example rotor blades or stator vanes.

Gas turbine engine components are susceptible to damage caused by ingestion of foreign objects and general fatigue. Such damage may result in stress concentrations and cracks, which limit the lives of the components. This is a particular problem for the leading edges and trailing edges of fan blades, compressor blades, compressor vanes, turbine blades and turbine vanes. One known solution is to increase the thickness of the aerofoil section at the leading and trailing edges of the blades or vanes. However, this adds weight and adversely affects the aerodynamic performance of the blades and vanes, reducing efficiency of the gas turbine engine.

It has been proposed to introduce regions of residual compressive stress into aerofoils, ideally resulting in the entire cross-section of the leading and trailing edges being under compression. By creating such through thickness compression the residual stresses in the leading and trailing edges of the blades and vanes are purely compressive and the tendency for cracks to grow reduced. The stress field is equalised out in the less critical remainder of the blades and vanes.

Our published European patent application EP1191112A1 discloses producing compressive stresses into a component using an electrical discharge to produce a pressure pulse in a medium adjacent the component without the electrical discharge directly contacting the component and the pressure pulse impacts on a surface of the component to produce a region of compressive residual stress in the component.

In this approach a single line of processing is generated by the electric discharge. A disadvantage of the single line of processing is that in order to produce compressive residual stress over a large area of a component it is necessary to scan the electric discharge over an area of the component requiring a compressive residual stress. This limits the speed of production of the compressive residual stress in the component and hence the time to produce the compressive residual stress in the component. In addition, a point electrical discharge produces a spherical ultrasonic pressure pulse wave front, which reduces in intensity as $1/R^2$ and a line electrical discharge produces a cylindrical ultrasonic pressure pulse wave front, which reduces in intensity as $1/R$., where R is the radius.

A further problem with this process is that the repetition rate for producing the electrical discharge is limited by the gaseous products generated by the electrical discharge. These gaseous products must be allowed time to clear from the fluid medium before the next electrical discharge.

Accordingly the present invention seeks to provide a novel method of pre-stressing a component, which reduces, preferably overcomes, the above-mentioned problem.

Accordingly the present invention provides a method of pre-stressing a component, the method comprising providing an electrically conducting sheet adjacent to a component within a medium, supplying an electrical discharge to the electrically conducting sheet to produce vaporisation of the electrically conducting sheet, the vaporisation of the electrically conducting sheet producing a pressure pulse in the medium adjacent to the component, the pressure pulse impacting a surface of the component to produce a region of residual compressive stress within the component.

Preferably the vaporisation of the electrically conducting sheet producing a pressure pulse in the medium adjacent to the component without the electrical discharge directly contacting the component.

Preferably the electrically conducting sheet comprising a flexible membrane having an electrically conducting coating on at least one surface.

Preferably the electrically conducting sheet comprising a plastic membrane having a metallic coating on at least one surface.

Preferably the method comprises positioning a first predetermined length of the electrically conducting sheet adjacent a first region of the component, supplying an electrical discharge to the first predetermined length of the electrically conducting sheet to produce vaporisation of the first predetermined length of the electrically conducting sheet and positioning a second predetermined length of the electrically conducting sheet adjacent a second region of the component, supplying an electrical discharge to the second predetermined length of the electrically conducting sheet to produce vaporisation of the second predetermined length of the electrically conducting sheet.

Preferably the method comprises providing a continuous supply of the electrically conducting sheet, the first and second predetermined lengths of the electrically conducting sheets being longitudinally adjacent portions of the continuous supply of the electrically conducting sheet.

Preferably the method comprises providing a backing member to hold the electrically conducting sheet adjacent the component.

Preferably the backing member is shaped to correspond to the shape of the component.

Preferably the method comprises passing the electrically conducting sheet over the backing member. Preferably the method comprises passing the electrically conducting sheet over guides. Preferably passing the electrically conducting sheet over rollers.

Preferably unwinding the continuous electrically conducting sheet from a first reel and winding onto a second reel.

Alternatively the method comprising placing a plurality of electrically conducting sheets on the component in side by side relationship, supplying an electrical discharge to a first predetermined length of a first one of the electrically conducting sheets to produce vaporisation of the first predetermined length of the first electrically conducting sheet and supplying an electrical discharge to the a predetermined length of the first electrically conducting sheet to produce vaporisation of the second predetermined length of the first electrically conducting sheet.

Preferably the method further comprises supplying the fluid medium over the component to remove the products of the electrical discharge from the component.

Preferably the method comprises providing a guide to guide the fluid medium over the component.

Preferably the method comprises collecting the fluid medium after passing over the component.

The backing member may be porous, or has passages, and supplying the fluid medium through the backing member and over the surface of the component.

Preferably the component is a component for a gas turbine engine. Preferably the component is a blade or a vane. Preferably the blade is a fan blade, a compressor blade or a turbine blade.

Preferably the pressure pulse has a planar pressure pulse wave front produced by a planar electrically conducting sheet. Alternatively the pressure pulse has a predetermined shape of wave front produced by an electrically conducting sheet having a predetermined shape. The predetermined shape may be a part cylindrical shape or a part parabolic shape. The predetermined shape may focus the pressure pulse to a line of high intensity.

The present invention also provides an apparatus for pre-stressing a component comprising an electrically conducting sheet within a medium, means to supply an electrical discharge to the electrically conducting sheet to produce vaporisation of the electrically conducting sheet, in use a component is locatable adjacent the electrically conducting sheet, the vaporisation of the electrically conducting sheet producing a pressure pulse in the medium adjacent to the component, the pressure pulse impacting a surface of the component to produce a region of residual compressive stress within the component.

Preferably the electrically conducting sheet comprising a flexible membrane having an electrically conducting coating on at least one surface.

Preferably the electrically conducting sheet comprising a plastic membrane having a metallic coating on at least one surface.

Preferably there is a continuous supply of the electrically conducting sheet.

Preferably there is a backing member to hold the electrically conducting sheet adjacent the component.

Preferably the backing member is shaped to correspond to the shape of the component.

Preferably there are means to pass the electrically conducting sheet over the backing member. Preferably the means to pass the electrically conducting sheet over the backing sheet comprises at least one roller.

Preferably the continuous electrically conducting sheet being wound from a first reel to a second reel.

Preferably there are means for supplying the fluid medium over the component to remove the products of the electrical discharge from the component.

Preferably the apparatus comprises a guide to guide the fluid medium over the component.

Preferably the apparatus comprises a collector to collect the fluid medium after passing over the component.

The backing member may be porous, or has passages, and means to supply the fluid medium through the backing member and over the surface of the component.

Preferably the electrically conducting sheet is planar to produce a pressure pulse with a planar wave front. Alternatively the electrically conducting sheet may be formed to a predetermined shape to produce a pressure pulse with a wave front of predetermined shape. The predetermined shape may be a part cylindrical shape or a part parabolic shape. The predetermined shape may focus the pressure pulse to a line of high intensity.

The present invention will be more fully described by way of example with reference to the accompanying drawings in which:—

FIG. 11 shows another apparatus for pre-stressing a component according to the present invention.

Figure 1:
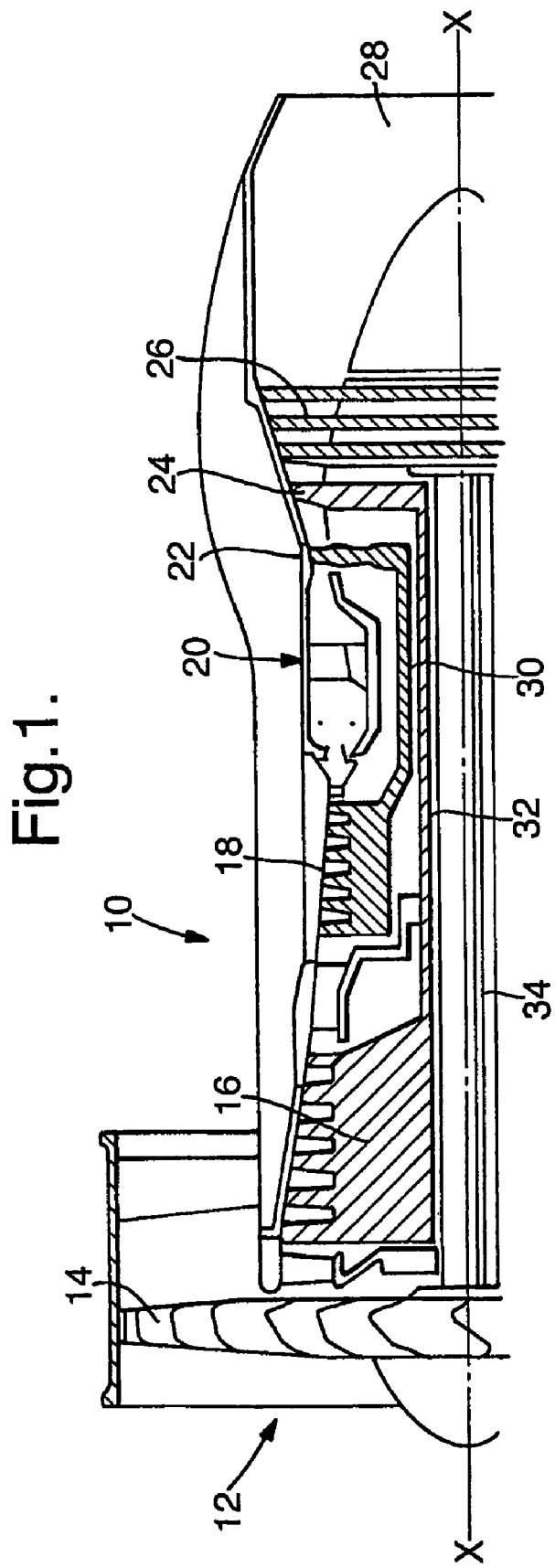
FIG. 1 is a view of a turbofan gas turbine engine having a rotor blade prestressed according to the present invention.

A turbofan gas turbine engine 10, as shown in FIG. 1, comprises in axial flow series, an intake 12, a fan 14, an intermediate-pressure compressor 16, a high-pressure compressor 18, combustion equipment 20, a high-pressure turbine 22, an intermediate-pressure turbine 24, a low-pressure turbine 26 and an exhaust 28. The gas turbine engine 10 works in the conventional manner so that air entering the intake 12 is accelerated by the fan 14 to produce two airflows, a first airflow into the intermediate-pressure compressor 16 and a second airflow, which provides propulsive thrust. The intermediate-pressure compressor 16 compresses the airflow and delivers the air to the high-pressure compressor 18 where further compression takes place. The compressed air exhausted from the high-pressure compressor 18 is supplied to the combustion equipment 20 where it is mixed with fuel and the mixture is burnt. The hot gases produced in the combustion equipment 20 are expanded through and thereby drive the high-pressure turbine 22, the intermediate-pressure turbine 24 and the low-pressure turbine 26 before being exhausted through the exhaust 28 to provide additional thrust. The high, intermediate and low-pressure turbine 22, 24 and 26 respectively drive the high and intermediate-pressure compressors 18 and 16 respectively and the fan 14 by shafts 30, 32 and 34 respectively.

Figure 2:
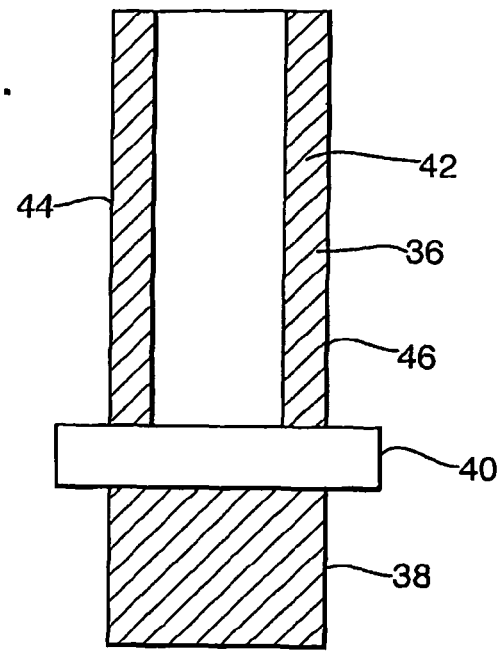
FIG. 2 is an enlarged view of a rotor blade prestressed according to the present invention.

A rotor blade 36 of the gas turbine engine 10, as shown in FIG. 2, comprises a root portion 38, a platform portion 40 and an aerofoil portion 42. The aerofoil portion 42 has a leading edge 44 and a trailing edge 46. The leading edge 44 and the trailing edge 46 of the aerofoil portion 42 and the root portion 38 have been prestressed with a residual compressive stress according to the present invention.

Figure 3:
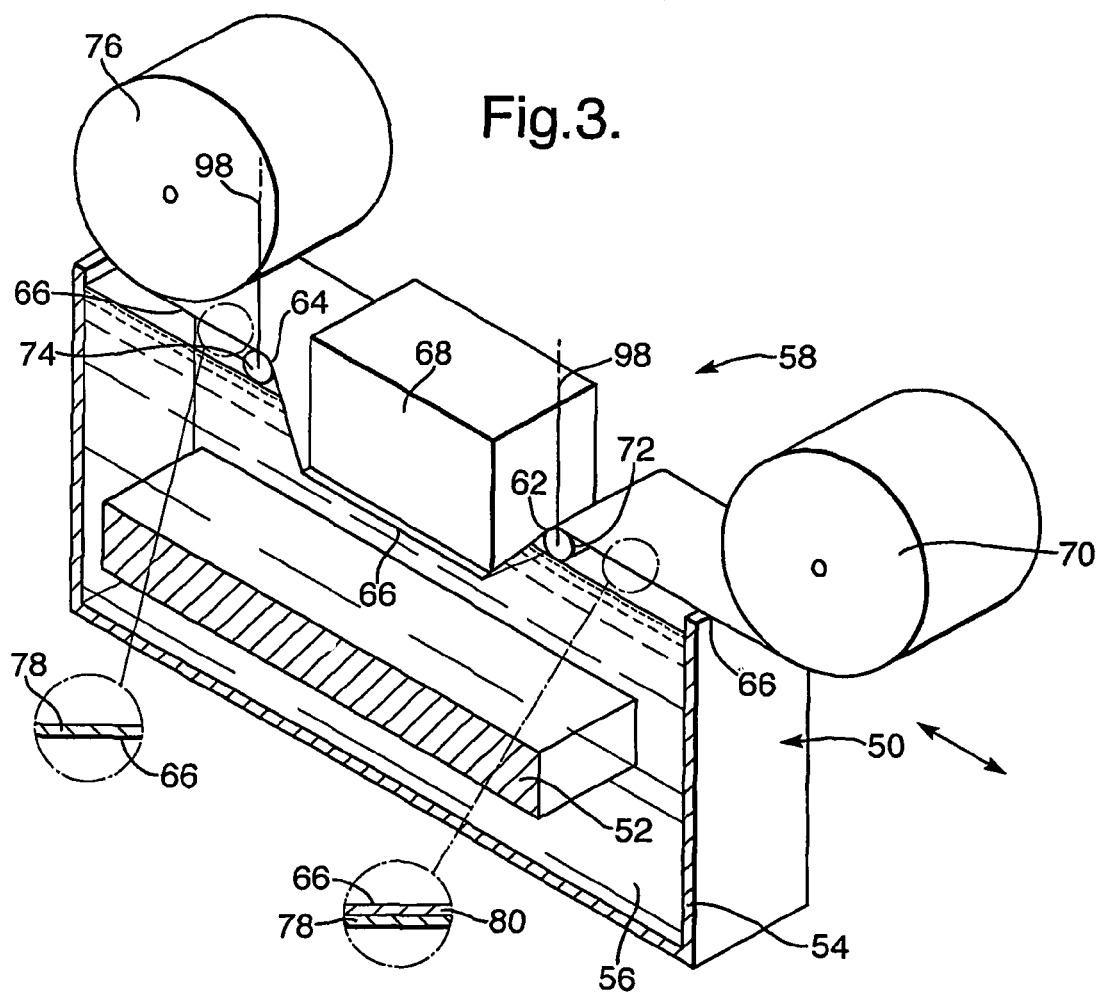
FIG. 3 shows an apparatus for pre-stressing a component according to the present invention.
Figure 4:
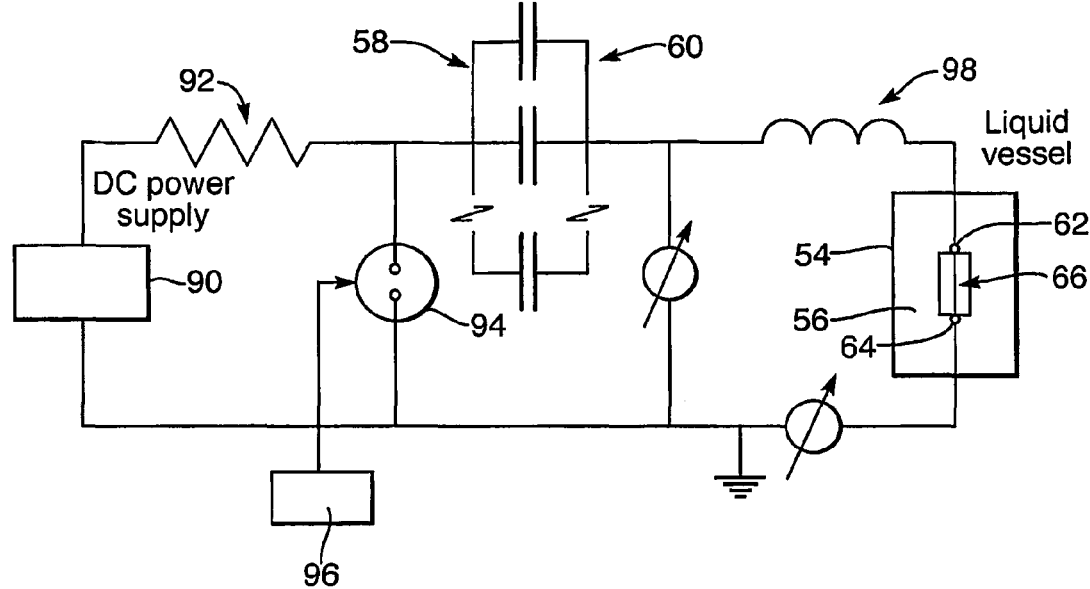
FIG. 4 is a circuit diagram for the apparatus for pre-stressing a component according to the present invention.

An apparatus 50, as shown in FIGS. 3 and 4, for pre-stressing a component 52 according to the present invention comprises a vessel 54 containing a fluid medium 56, for example water or oil. An electrical discharge circuit 58, e.g. an electrical pulsed power system, comprises a DC high voltage source 90 which charges an energy storage device 60, such as a high voltage capacitor or a bank of high voltage capacitors, to a level up to 50 kV through a charging resistor 92, a closing gas-filled switch 94 with a trigger 96, a transmission coaxial cable 98 and a pair of electrodes 62 and 64. The electrodes 62 and 64 are connected to an electrically conducting sheet 66 positioned in the fluid medium 56 in the vessel 54 adjacent to the component 52. A backing member 68 is arranged in the fluid medium 56 such that the electrically conducting sheet 66 is positioned between the component 52 and the backing member 68. When the electrical storage devices 60 are fully charged, the trigger 96 sends a triggering electrical pulse and the switch 94 is closed. After switch 94 is closed, electrical energy accumulated in the energy storage devices 60 transfers to the electrodes 62 and 64 via the coaxial high voltage cable 98. The high voltage appears at the ends of the electrically conducting sheet 66 and a high electrical current starts to flow through the electrically conducting sheet 66. The electrical energy accumulated in the energy storage devices 60 of the pulsed power system starts to dissipate first in the electrically conducting sheet 66 and then in the plasma channel developed through fast joule heating and vaporisation of the electrically conducting sheet 66 with the current and voltage wave forms determined by the electrical parameters of the pulsed power circuit (capacitance, inductance and resistance) and the physical parameters of the electrically conducting sheet 66 (length, cross-section and conductance). Preferably the current pulse created by the pulsed power system has a duration in the range 1-300 microseconds with a current rise time of less than 1 microsecond.

The electrically conducting sheet 66 is supplied, unwound, from a first supply reel 70 and is supplied over a first guide 72, for example a first roller, between the component 52 and the backing member 68. The used sheet 66 is then passed over a second guide 74, for example a second roller, to a second collection reel 76. The electrically conducting sheet 66 comprises a flexible membrane 78, for example a suitable plastic, which has a thin metallic coating 80 on one surface. The used sheet 66 is no longer electrically conducting because the used sheet 66 only comprises the flexible member 78 because the metallic coating 80 has been vaporised of the flexible membrane 78.

The first supply reel 70, first guide 72, backing member 68, second guide 74 and second reel 74 are mounted on a structure 82 which enables them to be moved relative to the vessel 54 and the component 52. The structure 82 is movable in perpendicular directions so that the whole, or a desired region, of the surface of the component 52 may be pre-stressed. The electrical discharge circuit 58 is preferably mounted on the structure 82. The structure 82 for example is moved along perpendicular tracks by hydraulic, pneumatic or electrical motors etc. Alternatively, the vessel 54 and component 56 are moved relative to the structure 82.

The electrical discharge circuit 58 is able to generate a very rapid electrical discharge through the electrically conducting sheet 66, which produces vaporisation of the electrically conducting sheet 66. The vaporisation, or evaporation, of the electrically conducting sheet 66 produces pressure pulse with planar wave fronts in the fluid 56 adjacent to the component 52 without the electrical discharge directly contacting the component 52. The planar wave front pressure pulses impact on a surface of the component 52 to produce a residual compressive stress within the surface of the component 52.

The first and second guides 72 and 74 are preferably metallic and are connected to the capacitor 60 of the electrical discharge circuit 58 so that they act as the electrodes 62 and 64.

The backing member 68 acts as a guide to hold the electrically conducting sheet 66 adjacent to the component 52 and also to act as a reflector to direct the pressure pulse towards the component 52.

In operation a first predetermined length of the electrically conducting sheet 66 is unwound from the first supply reel 70 and the first predetermined length of the electrically conducting sheet 66 is positioned adjacent a first region of the component 52. The electrical discharge circuit 58 is activated and the electrical discharge is supplied through the electrodes 62 and 64, e.g. first and second guides 72 and 74, and causes vaporisation of the metallic coating 80 from the first predetermined length of the electrically conducting sheet 66. The vaporisation of the metallic coating 80 of the electrically conducting sheet 66 produces an ultrasonic pressure pulse with a planar wave front. The ultrasonic pressure pulse impacts on the surface at the first region of the component 52 and introduce a residual compressive stress into the first region of the component 52.

Then a second predetermined length of the electrically conducting sheet 66 is unwound from the first supply reel 70 and the second predetermined length of the electrically conducting sheet 66 positioned adjacent a second region of the component 52 by moving the structure 82 carrying the first and second reels 70 and 76 and the first and second guides 72 and 74 relative to the vessel 54 and component 52. The electrical discharge circuit 58 is activated and the electrical discharge is supplied through the electrodes 62 and 64, e.g. first and second guides 72 and 74, and causes vaporisation of the metallic coating 80 from the second predetermined length of the electrically conducting sheet 66. The vaporisation of the metallic coating 80 of the electrically conducting sheet 66 produces an ultrasonic pressure pulse with a planar wave front. The ultrasonic pressure pulse impacts on the surface at the second region of the component 52 and introduce a residual compressive stress into the second region of the component 52.

Further predetermined lengths of the electrically conducting sheet 66 are unwound from the first reel 70 and then vaporised to introduce a residual compressive stress into further regions of the component 52. The used sheet 66 passes over the second guide 74 and is wound onto the second reel 76. Thus, the whole of the surface of the component 52, or a desired region of the surface of the component 52, is provided with a residual compressive stress.

Figure 5:
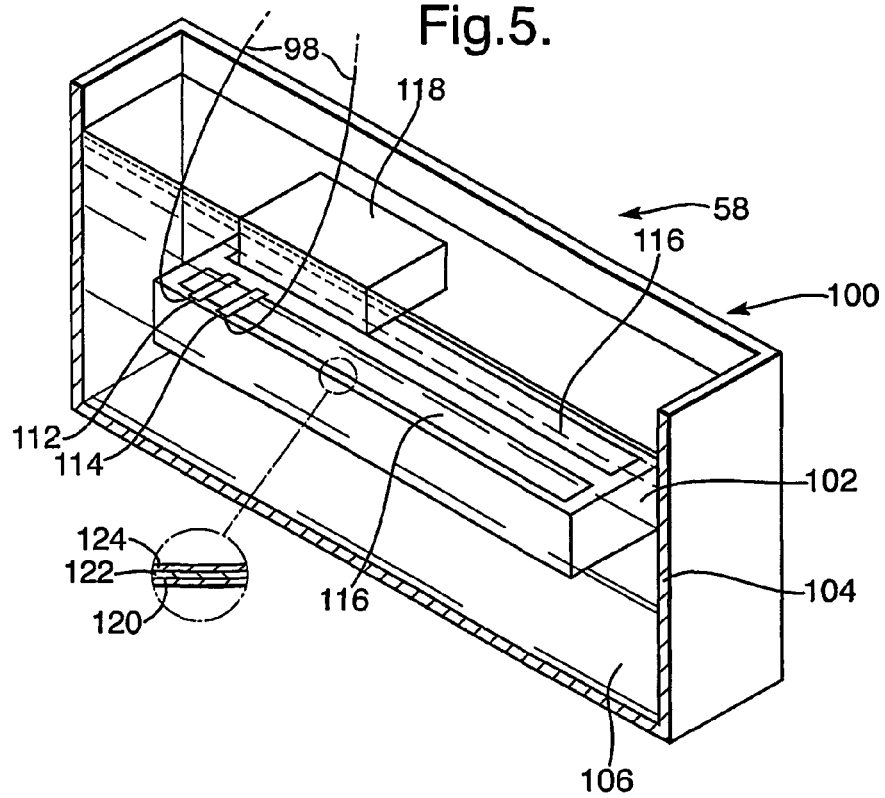
FIG. 5 shows another apparatus for pre-stressing a component according to the present invention.

Another apparatus 100, as shown in FIG. 5, for pre-stressing a component 102 comprises a vessel 104 containing a fluid medium 106, for example water or oil. An electrical discharge circuit 108 comprises a high voltage capacitor 110, or a bank of high voltage capacitors, and a pair of electrodes 112 and 114. The electrodes 112 and 114 are electrically connected to an electrically conducting sheet 116 positioned in the fluid medium 106 in the vessel 104 directly contacting the component 102. In particular the electrodes 112 and 114 are electrically connected to predetermined length of the electrically conducting sheet 116. A backing member 118 is arranged in the fluid medium 106 such that the electrically conducting sheet 116 is positioned between the component 102 and the backing member 118.

The electrically conducting sheet 116 comprises a flexible membrane 120, for example plastic, and a metallic coating 122. The flexible membrane 120 must be electrically insulating. The electrically conducting sheet 116 is arranged on the component 102 such that the flexible membrane 120 contacts the component 102 and the metallic coating 122 is spaced from the component 102 by the flexible membrane 120. The thickness of the flexible membrane 120 is selected to ensure that there is no discharge directly through the flexible membrane 120 to the component 102.

In operation a plurality of lengths of the electrically conducting sheet 116 are positioned side by side on the whole of the component 102 or on a region of the component 102. The electrical discharge circuit 108 is activated and the electrical discharge is supplied through the electrodes 112 and 114 and causes vaporisation of the metallic coating 122 from a first predetermined length of a first one of the electrically conducting sheets 116. The vaporisation of the metallic coating 122 of the electrically conducting sheet 116 produces an ultrasonic pressure pulse with a planar wave front. The ultrasonic pressure pulse impacts on the surface at a first region of the component 102 and introduce a residual compressive stress into the first region of the component 102.

The electrodes 112 and 114 are moved sequentially along the first electrically conducting sheet 116 and further predetermined lengths of the first electrically conducting sheet 116 are vaporised to introduce a residual compressive stress into further regions of the component 102. The electrodes 112 and 114 are then moved sequentially along the other electrically conducting sheets 116 and predetermined lengths of the other electrically conducting sheet 116 are vaporised to introduce a residual compressive stress into further regions of the component 102. Thus, the whole of the surface of the component 102, or a desired region of the surface of the component 102, is provided with a residual compressive stress.

The electrically conducting sheets 116 may alternatively be provided by depositing, painting or printing the electrically conducting sheets 116 onto the surface of the component 102. Thus, an electrically insulating layer is deposited on the component 102 and a metallic coating is deposited on the electrically insulating layer. A further electrically insulating layer may be deposited on the metallic coating.

Figure 6:
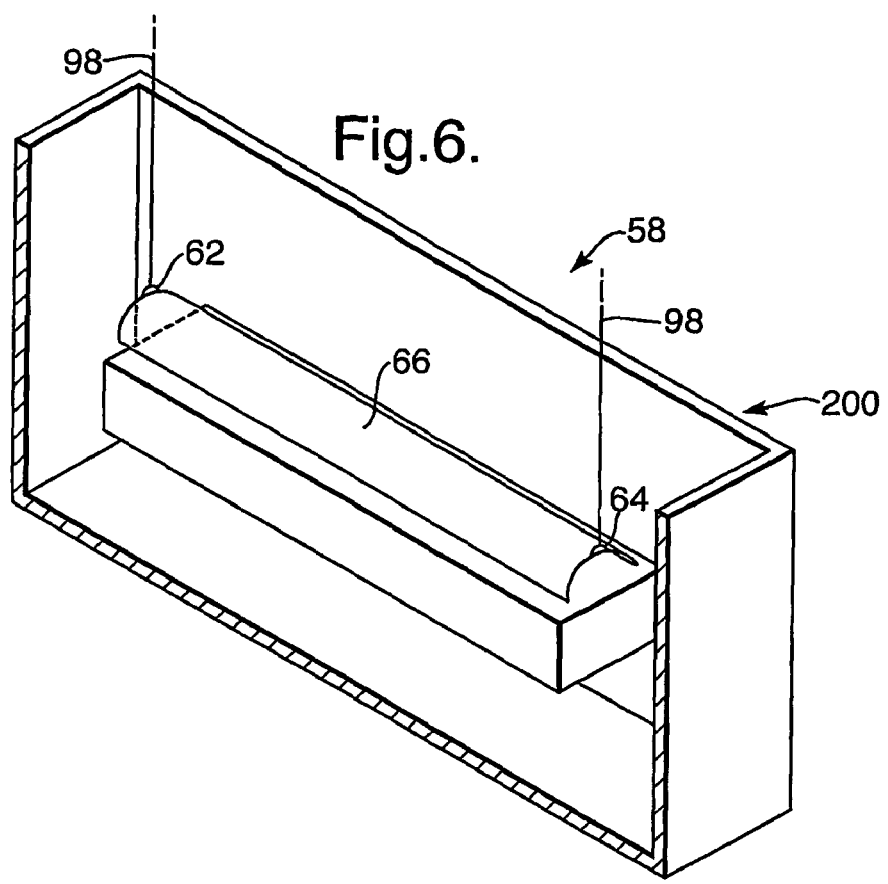
FIG. 6 shows another apparatus for pre-stressing a component according to the present invention.

Another apparatus for pre-stressing a component is shown in FIG. 6. The electrically conducting sheet 66 may be formed to a predetermined shape to produce a pressure pulse with a wave front of predetermined shape. The predetermined shape may be a part cylindrical shape or a part parabolic shape. The predetermined shape may focus/concentrate the pressure pulse to a line of high intensity on the component 52. The pressure pulse may be tailored to produce a modified pre-stressing distribution in the surface of the component 52. The backing member may be shaped to hold the electrically conducting sheet in position.

Figure 7:
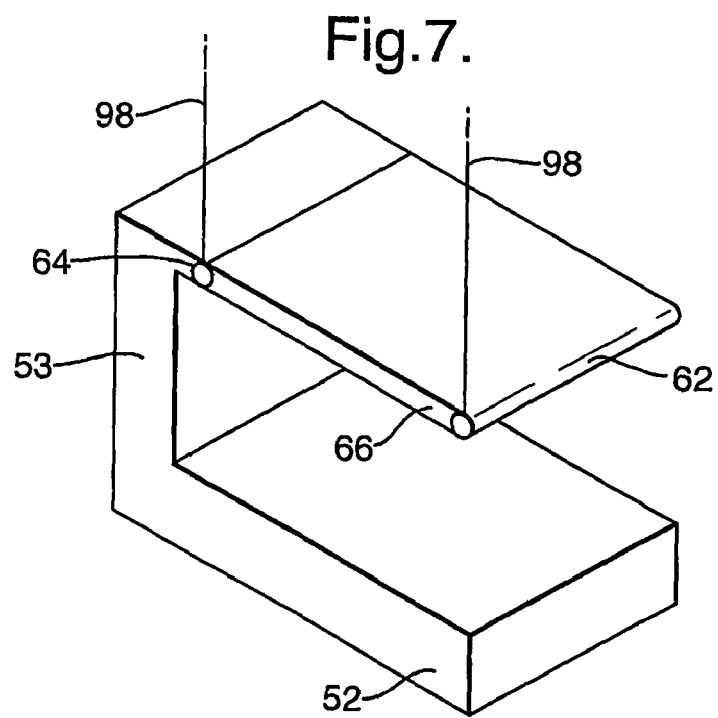
FIG. 7 shows a further apparatus for pre-stressing a component according to the present invention.

In FIG. 7 the component 52 has a part 53 extending away from and spaced from the surface of the component 52 and this part 53 forms one of the electrodes 64. The part 53 may be sacrificial in that the part 53 may be machined from the component 52 after the peening process.

Figure 8:
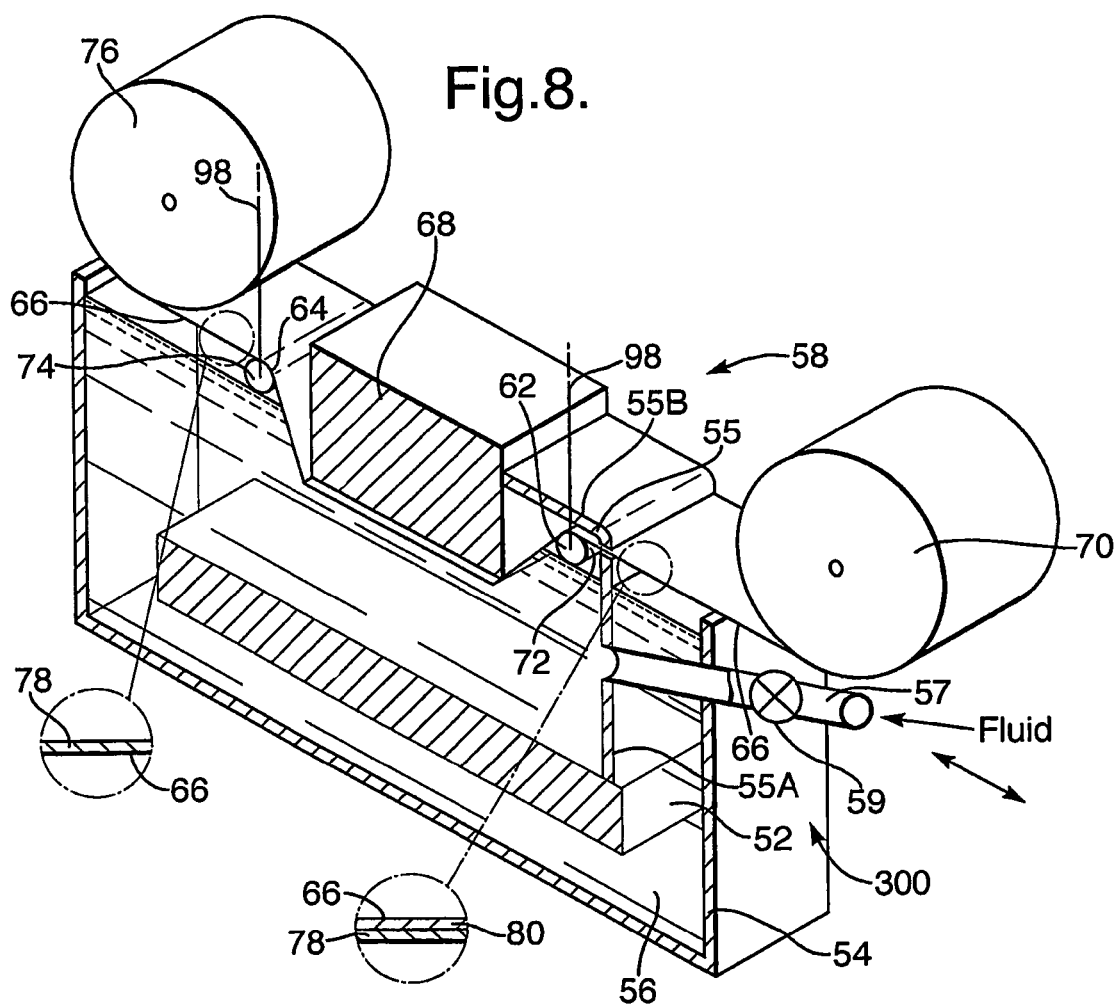
FIG. 8 shows an apparatus for pre-stressing a component according to the present invention.

Another apparatus 300 for pre-stressing a component is shown in FIG. 8 and is similar to FIG. 3 and like parts are denoted by like numerals.

The vessel 54 is provided with a guide member 55 and a supply pipe 57 and the supply pipe 57 has a valve 59 to control the supply of the fluid medium 56 such that the fluid medium 56 is directed to flow over the surface of the component 52. The guide member 55 comprises an end member 55A, a base member 55B and two side members 55C and 55D. The end member 55A and the side members 55C and 55D are arranged to extend substantially perpendicularly from the base member 55B and the side members 55C and 55D are arranged substantially perpendicularly to the end member 55A. The end member 55A and side members 55C and 55D are arranged to abut, or be in close proximity to, the component 52 and the end member 55A and to extend substantially perpendicularly away from the component 52 and the base member 55B extends generally parallel to the component 52. The end member 55A has an aperture to allow the electrically conducting sheet 66 to pass from the first reel 70 to the first roller 62. The guide member 55 is also mounted on the structure 82.

The guide member 55, supply pipe 57 and valve 59 are used to control a supply of the fluid medium 56 across the surface of the component 52 such that the fluid medium 56 removes the products, gases and other contaminants, of the vaporisation of the electrically conducting sheet 66 from the surface of the component 52. The guide member 55 supplies the fluid medium 56 over the surface of the component 52 between the component 52 and the backing member 68.

Figure 9:
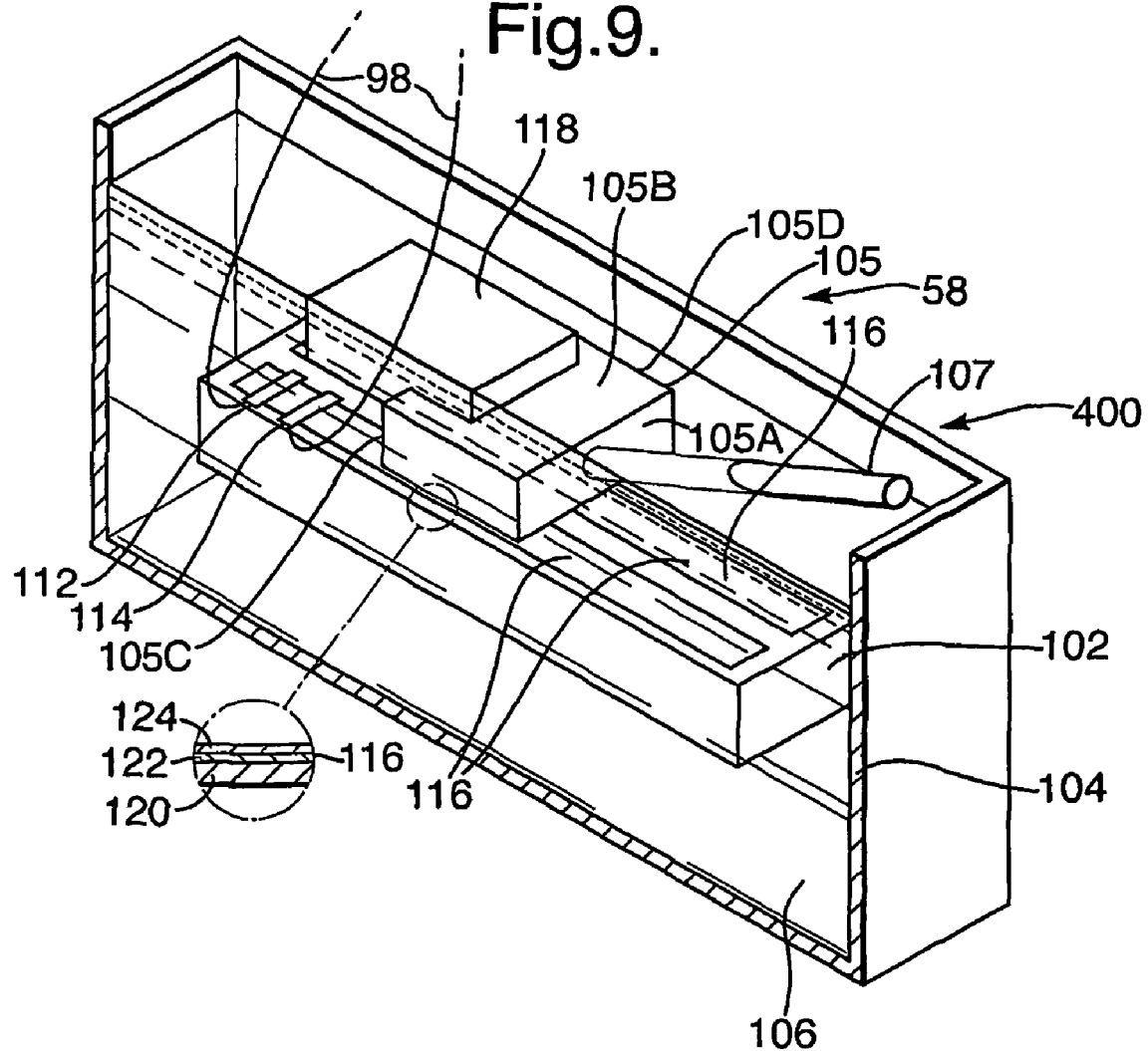
FIG. 9 shows a circuit diagram for the apparatus for pre-stressing a component according to the present invention.

A further apparatus 400 for prestressing a component is shown in FIG. 9 and is similar to FIG. 5 and like parts are denoted by like numerals.

The vessel 104 is provided with a guide member 105 and a supply pipe 107 and the supply pipe 107 has a valve 109 to control the supply of the fluid medium 106 such that the fluid medium 106 is directed to flow over the surface of the component 102. The guide member 105 comprises an end member 105A, a base member 105B and two side members 105C and 105D. The end member 105A and the side members 105C and 105D are arranged to extend substantially perpendicularly from the base member 105B and the side members 105C and 105D are arranged substantially perpendicularly to the end member 105A. The end member 105A and side members 105C and 105D are arranged to abut, or be in close proximity to, the component 102 and the end member 105A and to extend substantially perpendicularly away from the component 102 and the base member 105B extends generally parallel to the component 102.

The guide member 105, supply pipe 107 and valve 109 are used to control a supply of the fluid medium 106 across the surface of the component 102 such that the fluid medium 106 removes the products, gases and other contaminants, of the vaporisation of the electrically conducting sheet 116 from the surface of the component 102. The guide member 105 supplies the fluid medium 106 over the surface of the component.

The flow of the electrical current through the electrically conducting sheet produces explosive destruction of the electrically conducting sheet and this may be vaporisation of the electrically conducting sheet, melting of the electrically conducting sheet or a combination of vaporisation of the electrically conducting sheet and melting of the electrically conducting sheet to produce hot gases and molten metal droplets.

Although the present invention has been described with reference to producing pre-stressing in gas turbine engine rotor blades it is equally possible to produce pre-stressing in other components of a gas turbine engine, e.g. casings, stator vanes etc or in components of other engines or machines etc.

The advantage of the present invention is that a planar wave front pressure pulse is produced. A planar wave front pressure pulse is more effective than a cylindrical wave front or a spherical wave front. A planar wave front pressure pulse propagates through the medium without significant attenuation unlike a spherical wave front pressure pulse, which dissipates at a rate related to $1/R^2$ or a cylindrical wave front pressure pulse, which dissipates at a rate related to $1/R$, where R is the radius. A planar wave front pressure pulse has better propagation characteristics, so that a larger area may be processed with one discharge and allows a greater distance to be used between the discharge and the component so that the possibility of discharge to the component is reduced. The planar wave front pressure pulse produces more consistent and faster pre-stressing of components and allows larger scale pre-stressing of the components.

Figure 10:
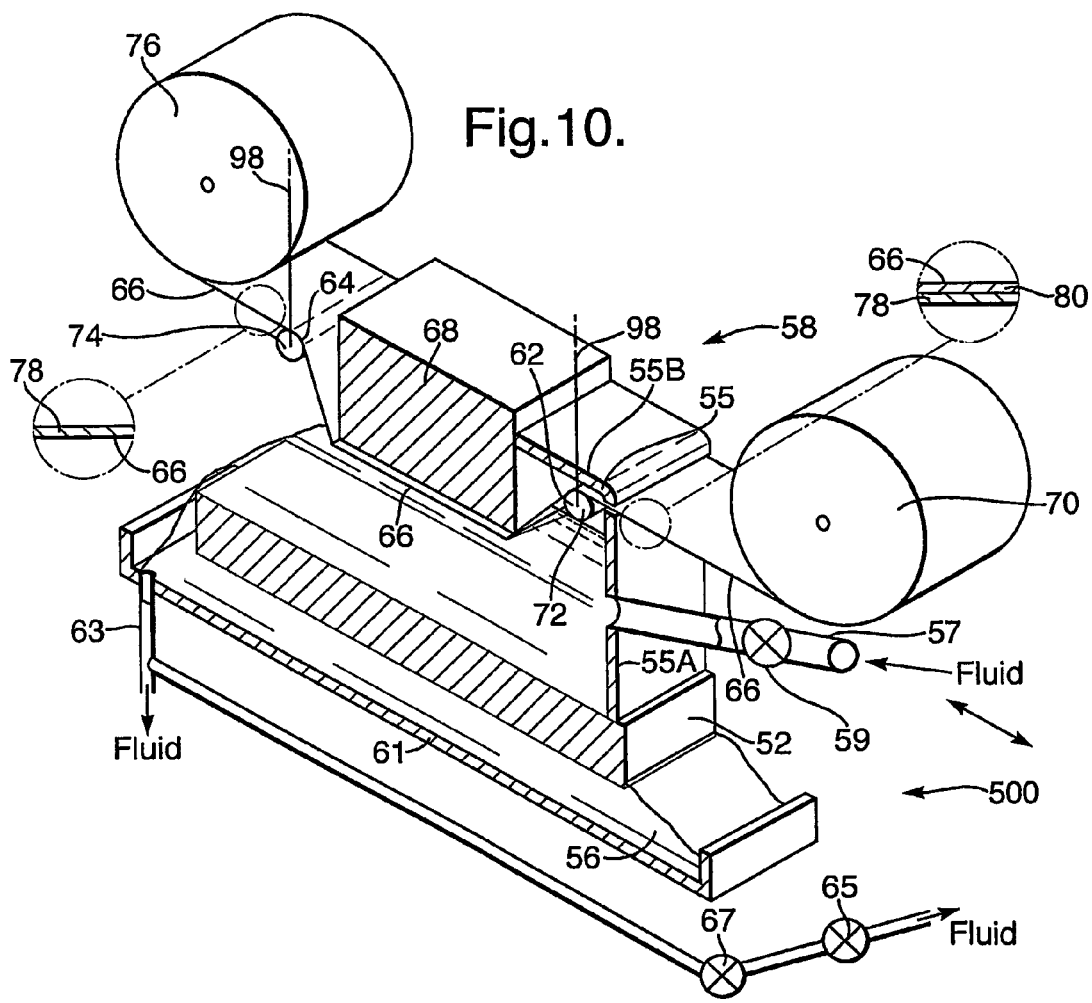
FIG. 10 shows another apparatus for pre-stressing a component according to the present invention.

Another apparatus 500, as shown in FIG. 10, for pre-stressing a component 52 according to the present invention is similar to that shown in FIG. 8 and like parts are denoted by like numerals. The embodiment in FIG. 10 differs in that it does not comprise a vessel containing a fluid medium for water or oil. In this embodiment a guide member 55, a supply pipe 57 and a valve 59 are provided to control the supply of the fluid medium 56 such that the fluid medium 56 is directed to flow over the surface of the component 52. A collector 61 is provided to collect the fluid medium 56 after it has flowed over the surface of the component 52. The collector 61 has a drain pipe 63 to take away the used fluid medium 56 and discharge products or the fluid medium 56 may be recirculated back over the component 52 by a pump 65 after the fluid medium 56 has been cleaned in a filter 67 to remove the discharge products.

A further apparatus 600, as shown in FIG. 11, for pre-stressing a component 52 according to the present invention is similar to that shown in FIG. 8 and like parts are denoted by like numerals. The embodiment in FIG. 11 differs in that the backing member 68 forms at least a part of the guide member 55. Again a guide member 55, a supply pipe 57 and a valve 59 are provided to control the supply of the fluid medium 56 such that the fluid medium 56 is directed to flow over the surface of the component 52. The pipe 57 may supply the fluid medium 56 through the backing member 68 and/or through another portion of the guide member 55. The backing member 68 may be porous or have a number of passages 69 extending therethrough to allow the fluid medium 56 to flow over the surface of the component 52.

The further advantage of the present invention is that it allows much more rapid pre-stressing over a larger area of a component. The present invention removes discharge products away from the component.

The invention claimed is:

1. A method of pre-stressing a component, the method comprising:
   providing an electrically conducting sheet adjacent to a component within a medium; and
   supplying an electrical discharge to the electrically conducting sheet to produce vaporisation of the electrically conducting sheet, wherein
      the vaporisation of the electrically conducting sheet producing a planar pressure pulse in the medium adjacent to the component,
      the planar pressure pulse impacting a surface of the component to produce a region of residual compressive stress within the component, and
      a space adjacent to the component is devoid of a die.

2. The method as claimed in claim 1 wherein the vaporisation of the electrically conducting sheet produces the planar pressure pulse in the medium adjacent to the component without the electrical discharge directly contacting the component.

3. The method as claimed in claim 1 wherein the electrically conducting sheet comprises a flexible membrane having an electrically conducting coating on at least one surface.

4. The method as claimed in claim 3 wherein the electrically conducting sheet comprises a plastic membrane having a metallic coating on at least one surface.

5. The method as claimed in claim 1 further comprising:
   positioning a first predetermined length of the electrically conducting sheet adjacent a first region of the component:
   supplying an electrical discharge to the first predetermined length of the electrically conducting sheet to produce vaporisation of the first predetermined length of the electrically conducting sheet;
   positioning a second predetermined length of the electrically conducting sheet adjacent a second region of component; and
   supplying an electrical discharge to the second predetermined length of the electrically conducting sheet to produce vaporisation of the second predetermined length of the electrically conducting sheet.

6. The method as claimed in claim 5 further comprising:
   providing a continuous supply of the electrically conducting sheet, wherein
      the first and second predetermined lengths of the electrically conducting sheets being longitudinally adjacent portions of the continuous supply of the electrically conducting sheet.

7. The method as claimed in claim 6 further comprising:
   providing a backing member to hold the electrically conducting sheet adjacent the component.

8. The method as claimed in claim 7 further comprising:
   providing a shaped backing member to correspond to a shape of the component.

9. The method as claimed in claim 7 further comprising:
   passing the electrically conducting sheet over the shaped backing member.

10. The method as claimed in claim 6 further comprising:
   passing the electrically conducting sheet over guides.

11. The method as claimed in claim 10 further comprising:
   passing the electrically conducting sheet over rollers.

12. The method as claimed in claim 6 further comprising:
   unwinding the continuous supply of the electrically conducting sheet from a first reel and winding the continuous supply of the electrically conducting sheet onto a second reel.

13. The method as claimed in claim 1 further comprising:
   placing a plurality of electrically conducting sheets on the component in a side by side arrangement;
   supplying an electrical discharge to a first predetermined length of a first one of the electrically conducting sheets to produce vaporisation of the first predetermined length of the first electrically conducting sheet; and
   supplying an electrical discharge to the first predetermined length produce vaporisation of the second predetermined length of the first electrically conducting sheet.

14. The method as claimed in claim 1 further comprising:
   supplying a fluid medium over the component to remove products of the electrical discharge from the component.

15. The method as claimed in claim 14 further comprising:
   collecting the fluid medium after passing over the component.

16. The method as claimed in claim 14 further comprising:
   providing a guide configured to guide the fluid medium over the component.

17. The method as claimed in claim 8 further comprising:
   supplying a fluid medium through the shaped backing member and over the surface of the component, wherein the shaped backing member is porous, or has passages.

18. The method as claimed in claim 1 wherein the component is a component for a gas turbine engine.

19. The method as claimed in claim 18 wherein the component is a blade or a vane.

20. The method as claimed in claim 19 wherein the blade is a fan blade, a compressor blade or a turbine blade.

21. An apparatus for pre-stressing a component comprising:
   an electrically conducting sheet within a medium;
   means for supplying an electrical discharge to the electrically conducting sheet to produce vaporisation of the electrically conducting sheet, wherein
      while in use, a component is locatable adjacent the electrically conducting sheet,
      the vaporisation of the electrically conducting sheet produces a planar pressure pulse in the medium adjacent to the component,
      the planar pressure pulse impacts a surface of the component to produce a region of residual compressive stress within the component, and
      a space adjacent to the component is devoid of a die.

22. The apparatus as claimed in claim 21 wherein the electrically conducting sheet comprises a flexible membrane having an electrically conducting coating on at least one surface.

23. The apparatus as claimed in claim 22 wherein the electrically conducting sheet comprises a plastic membrane having a metallic coating on at least one surface.

24. The apparatus as claimed in claim 21 further comprising:
   a continuous supply of the electrically conducting sheet.

25. The apparatus as claimed in claim 21 further comprising:
   a backing member to hold the electrically conducting sheet adjacent the component.

26. The apparatus as claimed in claim 25 wherein the backing member is shaped to correspond to the shape of the component.

27. The apparatus as claimed in claim 25 further comprising:
   means for passing the electrically conducting sheet over the backing member.

28. The apparatus as claimed in claim 27 wherein the means for passing the electrically conducting sheet over the backing member comprises at least one roller.

29. The apparatus as claimed in claim 24 wherein the continuous supply of electrically conducting sheet is wound from a first reel to a second reel.

30. The apparatus as claimed in claim 21 further comprising:
   means for supplying a fluid medium over the component to remove products of the electrical discharge from the component.

31. The apparatus as claimed in claim 30 further comprising:
   a guide configured to guide the fluid medium over the component.

32. The apparatus as claimed in claim 30 further comprising:
   a collector configured to collect the fluid medium after passing over the component.

33. The apparatus as claimed in claim 25 further comprising:
   means for supplying a fluid medium through the backing member and over the surface of the component, wherein the backing member is porous, or has passages.

* * * * *